United States Patent
Seo et al.

(10) Patent No.: US 10,606,122 B2
(45) Date of Patent: Mar. 31, 2020

(54) LIGHT SOURCE MODULE, AND BACKLIGHT UNIT AND LIQUID CRYSTAL DISPLAY DEVICE INCLUDING THE SAME

(71) Applicant: LG Display Co., Ltd., Seoul (KR)

(72) Inventors: MyungWon Seo, Bucheon-si (KR); Jaeyong Choi, Paju-si (KR); Kiyong Yang, Seoul (KR); MinJae Kang, Paju-si (KR); SeungJun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 43 days.

(21) Appl. No.: 15/835,166

(22) Filed: Dec. 7, 2017

(65) Prior Publication Data

US 2018/0180940 A1 Jun. 28, 2018

(30) Foreign Application Priority Data

Dec. 28, 2016 (KR) .................. 10-2016-0180612

(51) Int. Cl.
*G02F 1/1335* (2006.01)
*F21V 8/00* (2006.01)
*G02F 1/1343* (2006.01)

(52) U.S. Cl.
CPC ...... *G02F 1/133602* (2013.01); *G02B 6/0011* (2013.01); *G02B 6/0083* (2013.01); *G02F 1/1343* (2013.01); *G02F 1/133514* (2013.01); *G02F 1/133615* (2013.01); *G02B 6/009* (2013.01); *G02B 6/0068* (2013.01); *G02F 2202/22* (2013.01)

(58) Field of Classification Search
CPC ......... G02F 1/133602; G02F 1/133615; G02F 1/1343; G02F 1/133514; G02F 2202/22; G02B 6/0083; G02B 6/0011; G02B 6/0068; G02B 6/009
See application file for complete search history.

(56) References Cited

U.S. PATENT DOCUMENTS

| 4,510,560 A | 4/1985 | Negishi |
| 8,167,476 B2 * | 5/2012 | Sakamoto ............. G02B 6/009 362/249.02 |
| RE46,781 E * | 4/2018 | Go .................... G02F 1/133308 |
| 2005/0024573 A1* | 2/2005 | Suzuki ............. G02F 1/133308 349/149 |

(Continued)

FOREIGN PATENT DOCUMENTS

| CN | 105720179 A | * 6/2016 |
| CN | 105720179 A | 6/2016 |

(Continued)

*Primary Examiner* — Nitin Patel
*Assistant Examiner* — Amy Onyekaba
(74) *Attorney, Agent, or Firm* — Fenwick & West LLP

(57) ABSTRACT

Disclosed are a light source module, a backlight unit including the same, and a liquid crystal display device including the same, which prevent image quality and reliability from being degraded. The light source module includes a printed circuit board (PCB), a plurality of light sources mounted on the PCB, an optical member provided on the PCB to surround the plurality of light sources, an antistatic cover supported to the optical member to cover the plurality of light sources, and a ground member grounding the antistatic cover.

11 Claims, 6 Drawing Sheets

(56) References Cited

U.S. PATENT DOCUMENTS

| | | | |
|---|---|---|---|
| 2006/0139501 A1* | 6/2006 | Lee | G02F 1/133382 349/21 |
| 2007/0165424 A1* | 7/2007 | Sakai | G02B 6/0055 362/633 |
| 2008/0084699 A1* | 4/2008 | Park | B29C 45/14655 362/373 |
| 2008/0266482 A1* | 10/2008 | Ryu | G02F 1/133604 349/58 |
| 2009/0190061 A1* | 7/2009 | Lee | H05K 1/0209 349/58 |
| 2010/0128198 A1* | 5/2010 | Kim | G02B 6/0088 349/61 |
| 2010/0253872 A1* | 10/2010 | Park | G02B 6/0031 349/58 |
| 2010/0259948 A1* | 10/2010 | Chang | G02B 6/0025 362/606 |
| 2010/0321421 A1* | 12/2010 | Kee | G09G 3/3426 345/697 |
| 2011/0025944 A1* | 2/2011 | Lee | G02B 6/0036 349/61 |
| 2012/0075883 A1* | 3/2012 | Chen | G02B 6/002 362/607 |
| 2012/0147625 A1* | 6/2012 | Yang | G02B 6/0085 362/612 |
| 2012/0294038 A1 | 11/2012 | Huang et al. | |
| 2012/0319963 A1* | 12/2012 | Lee | G06F 3/044 345/173 |
| 2014/0078447 A1 | 3/2014 | Drolet et al. | |
| 2014/0285747 A1* | 9/2014 | Jun | G02F 1/133308 349/58 |
| 2014/0368769 A1* | 12/2014 | Lee | G02B 6/0068 349/65 |
| 2015/0036379 A1* | 2/2015 | Lee | G02F 1/133617 362/606 |
| 2015/0369993 A1* | 12/2015 | Kim | G02B 6/009 362/610 |
| 2016/0005925 A1* | 1/2016 | Kim | H01L 33/14 257/76 |
| 2017/0171962 A1* | 6/2017 | Byun | H05K 1/0256 |
| 2018/0373091 A1* | 12/2018 | Nagata | G02F 1/1333 |

FOREIGN PATENT DOCUMENTS

| | | | |
|---|---|---|---|
| JP | S57-174803 | A | 10/1982 |
| JP | 2010-225381 | A | 10/2010 |
| JP | 2015-122156 | A | 7/2015 |
| KR | 20130055203 | A * | 5/2013 |
| KR | 20150020886 | A | 2/2015 |
| TW | 200510856 | A | 3/2005 |
| TW | 201013098 | A | 4/2010 |
| TW | 201413344 | A | 4/2014 |

* cited by examiner

LIGHT SOURCE MODULE, AND BACKLIGHT UNIT AND LIQUID CRYSTAL DISPLAY DEVICE INCLUDING THE SAME

CROSS-REFERENCE TO RELATED APPLICATIONS

This application claims the benefit of the Republic of Korea Patent Application No. 10-2016-0180612 filed on Dec. 28, 2016, which is hereby incorporated by reference herein in its entirety.

BACKGROUND

Field of Technology

The present disclosure relates to a light source module, a backlight unit including the same, and a liquid crystal display (LCD) device including the same.

Discussion of the Related Art

Active matrix type LCD devices display a moving image by using a thin film transistor (TFT) as a switching element. The LCD devices can be miniaturized unlike cathode ray tube (CRT), and thus, are applied to display devices of portable information devices, office machines, computers, etc., in addition to televisions (TVs). Therefore, the LCD devices quickly replace the CRT. Since the LCD devices are not self-emitting devices, a backlight unit is provided under a liquid crystal panel, and an image is displayed by using light emitted from the backlight unit.

The backlight unit is categorized into a direct type backlight unit and an edge type backlight unit depending on a structure where a light source is arranged. The edge type backlight unit has a structure where the light source is disposed on one side of a light guide plate, and the direct type backlight unit has a structure where the light source is disposed under the liquid crystal panel. Here, the direct type backlight unit has a limitation in thinning, and thus, is mainly applied to LCD devices where brightness is more important than a thickness of a panel. The edge type backlight unit capable of thinning and miniaturizing unlike the direct type backlight unit is mainly applied to LCD devices where a thickness is important like notebook personal computers (PCs), monitor PCs, etc.

In the backlight unit, the light guide plate is disposed on the light source so as to reflect light, emitted from the light source, to the liquid crystal panel. In a process of disposing the light guide plate on the light source, a protective film attached on the light guide plate is removed, and at this time, static electricity occurs in the light guide plate. The static electricity occurring in the light guide plate is transferred to the light source, causing a short circuit defect where a portion of the light source is darkly burned. For this reason, in the backlight unit and the LCD devices of the related art, the light source is damaged by the static electricity, and image quality and reliability are degraded.

Moreover, in a related art light source, a Zener diode may be inserted into a light source package with the light source mounted thereon so as to prevent the occurrence of static electricity. However, if the Zener diode is inserted into the light source package for each of a plurality of light sources, the cost can increase significantly.

SUMMARY

Accordingly, the present disclosure is directed to provide a light source module, a backlight unit including the same, and a liquid crystal display (LCD) device including the same that substantially obviate one or more problems due to limitations and disadvantages of the related art.

An aspect of the present disclosure is directed to provide a light source module, a backlight unit including the same, and an LCD device including the same, which prevent image quality and reliability from being degraded.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light source module including a printed circuit board (PCB), a plurality of light sources mounted on the PCB, an optical member provided on the PCB to surround the plurality of light sources, an antistatic cover supported to the optical member to cover the plurality of light sources, and a ground member grounding the antistatic cover, a backlight unit including the same, and a liquid crystal display device including the same.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
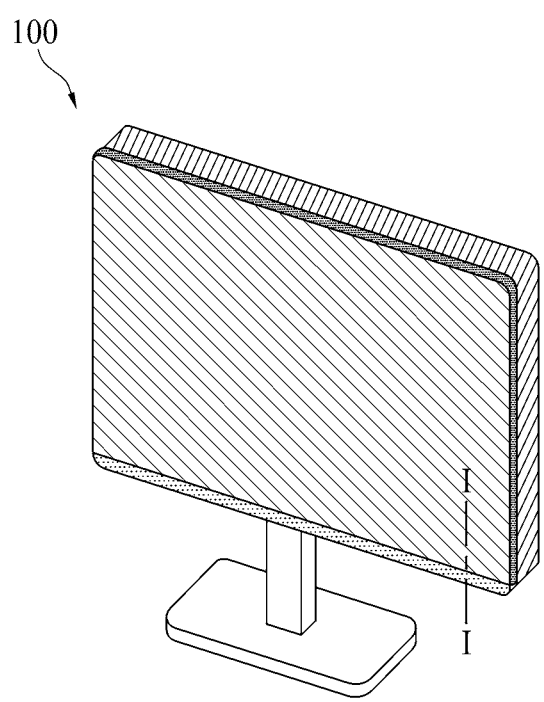
FIG. 1 is a perspective view of an LCD device according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of an organic light emitting display device according to the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

Hereinafter, embodiments of the present disclosure will be described in detail with reference to the accompanying drawings.

Figure 2:
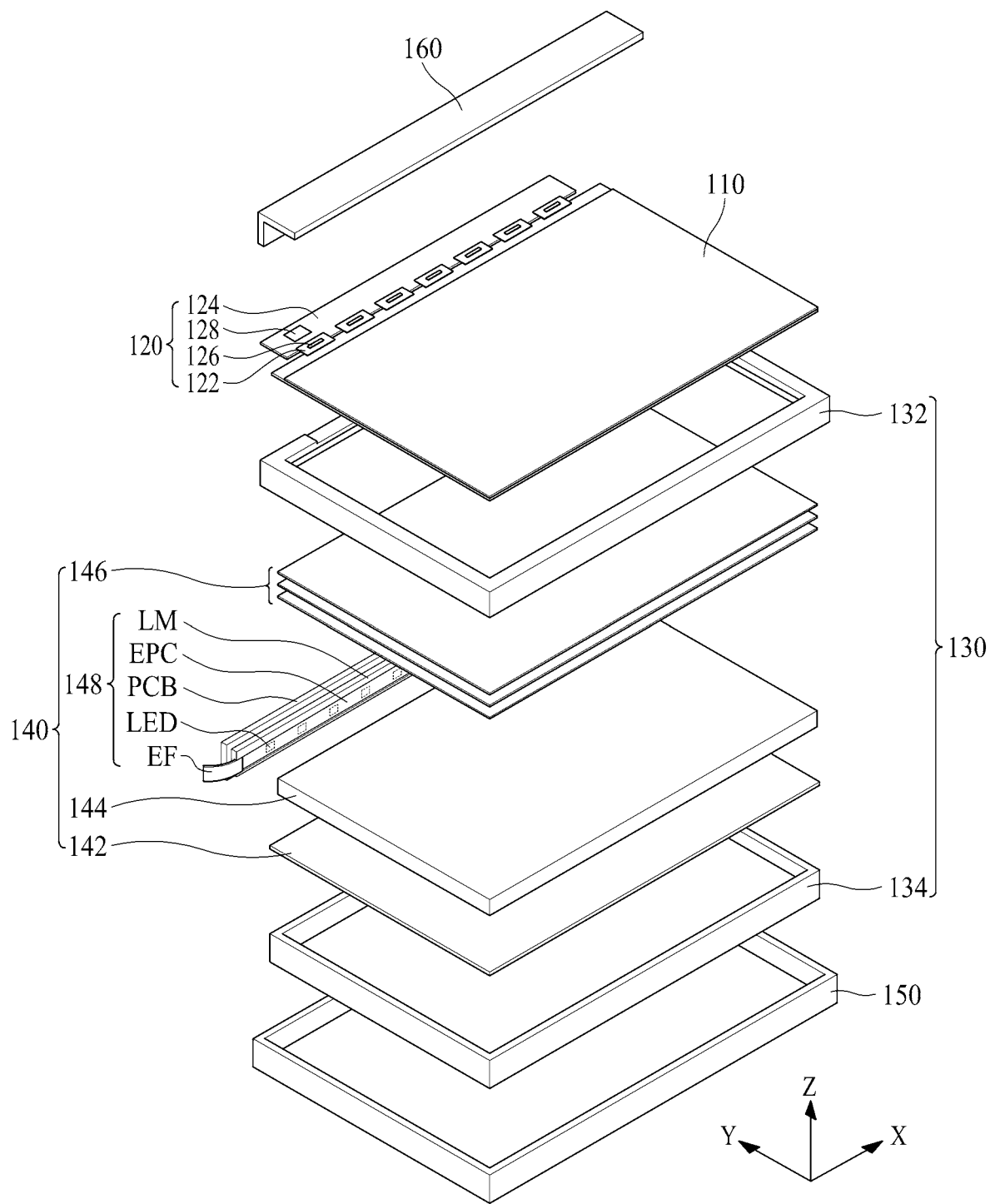
FIG. 2 is an exploded perspective view for describing in detail an LCD device according to an embodiment of the present disclosure.
Figure 3:
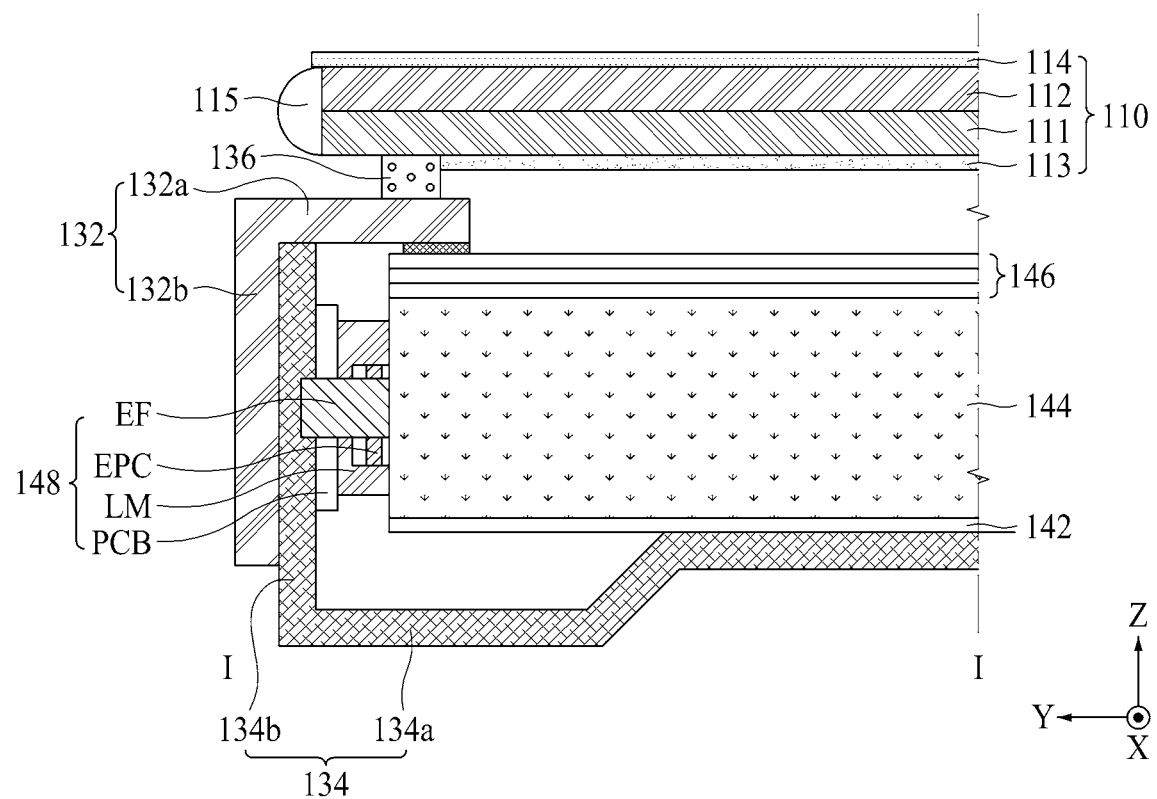
FIG. 3 is a cross-sectional view of an LCD device according to an embodiment of the present disclosure.

FIG. 1 is a perspective view of an LCD device 100 according to an embodiment of the present disclosure. FIG. 2 is an exploded perspective view for describing in detail an LCD device according to an embodiment of the present disclosure. FIG. 3 is a cross-sectional view of an LCD device according to an embodiment of the present disclosure.

Referring to FIGS. 1 to 3, the LCD device 100 according to an embodiment of the present disclosure may include a liquid crystal panel 110, a panel driver 120, a panel supporting part 130, a backlight unit 140, an appearance case 150, and a front cover 160.

The liquid crystal panel 110 may display an image by using light irradiated from the backlight unit 140. The liquid crystal panel 110 may adjust a light transmittance of a liquid crystal layer to display an image and may include a lower substrate 111 and an upper substrate 112 facing-bonded to each other with the liquid crystal layer (not shown) therebetween, a lower polarization member 113 attached on the lower substrate 111, an upper polarization member 114 attached on the upper substrate 112, and a side sealing member 115 attached on a side surface of the upper substrate 112. The liquid crystal panel 110 may drive the liquid crystal layer with an electric field which is generated in each of a plurality of pixels according to a common voltage and a data voltage applied to each pixel, thereby displaying a color image according to a light transmittance of the liquid crystal layer.

The lower substrate 111 may be a thin film transistor (TFT) array substrate and may include a plurality of pixels (not shown) respectively provided in a plurality of pixel areas defined by intersections of a plurality of gate lines (not shown) and a plurality of data lines (not shown). Each of the pixels may include a TFT connected to a data line and a gate line, a pixel electrode connected to the TFT, and a common electrode which is disposed adjacent to the pixel electrode and is supplied with a common voltage. In this case, the common electrode may be disposed on the upper substrate 112 depending on a driving mode of the liquid crystal layer. An electric field corresponding to a difference voltage between the data voltage and the common voltage applied to each pixel of the lower substrate 111 may be generated to adjust a light transmittance of color light passing through the upper substrate 112 and the liquid crystal layer, thereby allowing the liquid crystal panel 110 to display a color image.

A pad part (not shown) which is supplied with various signals for driving each pixel may be provided under or on the lower substrate 111. In this case, the panel driver 120 for driving the liquid crystal panel 110 may be connected to the pad part.

The upper substrate 112 may be a color filter array substrate and may be provided to have an area which is relatively smaller than the lower substrate 111. The upper substrate 112 may be bonded to the lower substrate 111 with the liquid crystal layer therebetween to overlap an area other than the pad part of the lower substrate 111. In this case, the upper substrate 112 may include a widthwise and lengthwise light blocking layer (not shown) for defining a pixel area corresponding to each pixel provided on the lower substrate 111, an edge light blocking layer (not shown) provided in an edge of the upper substrate 112, and a color filter (not shown) provided in each of the pixel areas. The color filter may filter light, which is incident through the lower substrate 111 from the backlight unit 140 and travels the light toward the upper substrate 112, into color light. The common electrode (not shown) which is supplied with the common voltage may be disposed on the upper substrate 112 depending on a driving mode of the liquid crystal layer.

A detailed structure of each of the lower substrate 111 and the upper substrate 112 may be implemented as various types well known to those skilled in the art, based on a driving mode of the liquid crystal layer, for example, a twisted nematic (TN) mode, a vertical alignment (VA) mode, an in-plane switching (IPS) mode, and a fringe field switching (FFS) mode.

The lower polarization member 113 may be attached on a rear surface of the lower substrate 111 and may be disposed in a portion other than an end of the lower substrate 111. The lower polarization member 113 may polarize light incident from the backlight unit 140.

The upper polarization member 114 may be attached on a top of the upper substrate 112 and may polarize color light which passes through the upper substrate 112 and is output to the outside.

The side sealing member 115 may be disposed to cover a side surface of each of the lower substrate 111 and the upper substrate 112, for preventing the leakage of light and protecting the side surface of each of the lower substrate 111 and the upper substrate 112. The side sealing member 115 may be formed of a thermocurable resin, photocurable resin, and/or the like.

The panel driver 120 may be connected to the pad part provided on the lower substrate 111 to drive each pixel of the liquid crystal panel 110, thereby allowing the liquid crystal panel 110 to display a color image. The panel driver 120 according to an embodiment may include a plurality of circuit films 122 connected to the pad part of the liquid crystal panel 110, a data driving integrated circuit (IC) 126 mounted on each of the plurality of circuit films 122, a display printed circuit board (PCB) 124 coupled to each of the plurality of circuit films 122, and a timing controller 128 mounted on the display PCB 124.

Each of the circuit films 122 may be attached between the pad part of the lower substrate 111 and the display PCB 124 through a film attaching process and may be formed of a tape carrier package (TCP) or a chip-on film (COF) (or a chip on flexible board). Each of the circuit films 122 may be bent along one side surface (i.e., a lower surface) of the liquid crystal panel 110 and may be disposed on a rear surface of a guide frame 132.

The data driving IC 126 may be mounted on each of the plurality of circuit films 122 and may be connected to the pad part through the circuit film 122. The data driving IC 126 may receive pixel-based pixel data and a data control signal supplied from the timing controller 128, convert the pixel-based pixel data into an analog data signal according to the data control signal, and supply the analog data signal to a corresponding data line through the pad part.

The display PCB 124 may be connected to the plurality of circuit films 122. The display PCB 124 may supply signals, which are necessary for displaying an image on each pixel of the liquid crystal panel 110, to the data driving IC 126 and a gate driving circuit. To this end, various signal lines, various power circuits (not shown), and a memory device (not shown) may be mounted on the display PCB 124.

The timing controller 128 may be mounted on the display PCB 124. In response to a timing sync signal supplied from an external driving system (not shown), the timing controller 128 may align digital video data input from the driving system according to a pixel arrangement structure of the liquid crystal panel 110 to generate the pixel-based pixel data and may supply the generated pixel-based pixel data to the data driving IC 126. Also, the timing controller 128 may generate a data control signal and a gate control signal based on the timing sync signal to control a driving timing of each of the data driving IC 126 and the gate driving circuit.

In addition, the timing controller 128 may control the backlight unit 140 by using edge type local diming technology to individually control an area-based luminance of the liquid crystal panel 110.

The panel supporting part 130 may include the guide frame 132 and a light source housing 134.

The guide frame 132 may be disposed under the liquid crystal panel to support the liquid crystal panel 110. The guide frame 132 may be coupled to the liquid crystal panel 110 through a panel coupling member 136. In this case, the panel coupling member 136 may be coupled to the lower substrate 111 of the liquid crystal panel 110, based on a coupling force between the guide frame 132 and the liquid crystal panel 110 and a thickness of each of the guide frame 132 and the liquid crystal panel 110, but is not limited thereto. In other embodiments, the panel coupling member 136 may be coupled to the lower polarization member 113 of the liquid crystal panel 110. For example, the panel coupling member 136 may be a double-sided tape, a thermocurable adhesive, a photocurable adhesive, a foam tape, or the like, and particularly, may be the double-sided tape or the foam tape having a certain elastic force for absorbing an impact. In addition, the panel coupling member 136 may include a hollow portion, and in this case, the hollow portion reduces pressure applied to the liquid crystal panel 110 and prevents the panel coupling member 136 from being stripped from the liquid crystal panel 110 when the liquid crystal panel 110 moves.

The guide frame 132 may include a panel coupling part 132a and a guide side wall 132b.

The panel coupling part 132a may be coupled to a rear edge of the liquid crystal panel 110 by the panel coupling member 136. In this case, the panel coupling part 132a may be coupled to a rear edge of the lower substrate 111 by the panel coupling member 136, but is not limited thereto. In other embodiments, the panel coupling part 132a may be coupled to an edge of the lower polarization member 113 attached on a whole rear surface of the lower substrate 111.

The guide side wall 132b may be bent vertically from the panel coupling part 132a and may be coupled to the light source housing 134. In this case, a coupling groove may be provided in the guide side wall 132b, and thus, the guide side wall 132b may be coupled to the light source housing 134.

The light source housing 134 may accommodate the backlight unit 140 and may support the guide frame 132. The light source housing 134 may include a floor 134a and a housing side wall 134b.

The floor 134a may support the light guide plate 144, and an end of the floor 134a may be bent, thereby supporting the light guide plate 144.

The housing side wall 134b may be bent vertically from one end of the floor 134a and may be coupled to the guide side wall 132b of the guide frame 132. In this case, a projection may be provided in the housing side wall 134b and may be coupled to a groove provided in the guide side wall 132b, and for example, the housing side wall 134b may be mutually coupled to the guide side wall 132b by a fastening member such as a screw.

The backlight unit 140 may be disposed under the liquid crystal panel 110 to irradiate light onto a lower surface. Therefore, the backlight unit 140 may be disposed under the liquid crystal panel 110. In this case, the backlight unit 140 may be accommodated into the light source housing 134. The backlight unit 140 according to an embodiment may include a reflective sheet 142, the light guide plate 144, an optical sheet part 146, and a light source module 148.

The reflective sheet 142 may be disposed on a bottom of the light guide plate 144 to reflect light, which is incident from the light guide plate 144, toward the light guide plate 144, thereby minimizing the loss of light traveling to a rear surface of the light guide plate 144.

The light guide plate 144 may include a light incident surface provided on a first side surface thereof and may be implemented in a plate shape (or a wedge shape). The light guide plate 144 may allow light incident through the light incident surface from the light source module 148 to travel toward the liquid crystal panel 110.

The optical sheet part 146 may be disposed on the light guide plate 144 and may include a lower diffusive sheet, a prism sheet, and an upper diffusive sheet, but is not limited thereto. In other embodiments, the optical sheet part 146 may be configured by a stacked combination of two or more elements selected from among a diffusive sheet, a prism sheet, a dual brightness enhancement film, and a reticular sheet.

The light source module 148 may be disposed to face the first side surface of the light guide plate 144 and may be provided on one side surface of the light guide plate 144 to irradiate light onto the light incident surface. The light source module 148 according to an embodiment may include a plurality of light sources LED which are mounted on a light source printed circuit board PCB and emit lights according to a light source driving signal supplied from a backlight driver (not shown), an antistatic cover EPC which are disposed on the plurality of light sources LED, an optical member LM which accommodates the antistatic cover EPC, and a ground member EF which grounds the antistatic cover EPC.

In a backlight unit and an LCD device of the related art, static electricity occurs in a process of removing the protective film attached on the light guide plate 144 and is transferred to the light source LED, causing a short circuit defect where a portion of the light source LED is darkly burned. On the other hand, in the backlight unit 140 and the LCD device 100 according to an embodiment of the present disclosure, due to the ground member EF that connects one end of the antistatic cover EPC to the light source housing 134, static electricity flows out to the light source housing 134 without being transferred to the light sources LED. Accordingly, in the backlight unit 140 and the LCD device 100 according to an embodiment of the present disclosure, since the light source module 148 including the ground member EF is provided, a short circuit defect of the light source LED is prevented from occurring due to static electricity, thereby preventing image quality and reliability from being degraded.

In FIG. 3, it is illustrated that the ground member EF contacts the housing side wall 134b of the light source housing 134, but the present embodiment is not limited thereto. In other embodiments, the ground member EF may contact the floor 134a of the light source housing 134, or may be disposed to contact the below-described appearance case 150.

The light source module 148 will be described below in detail with reference to FIGS. 4 to 7.

The appearance case 150 may accommodate the light source housing 134 and may surround a side surface of the guide frame 132, thereby forming an appearance.

The front cover 160 may be coupled to the guide frame 132 to cover one edge of the liquid crystal panel 110. The front cover 160 may conceal the panel driver 120 connected to the one edge of the liquid crystal panel 110.

Figure 4:
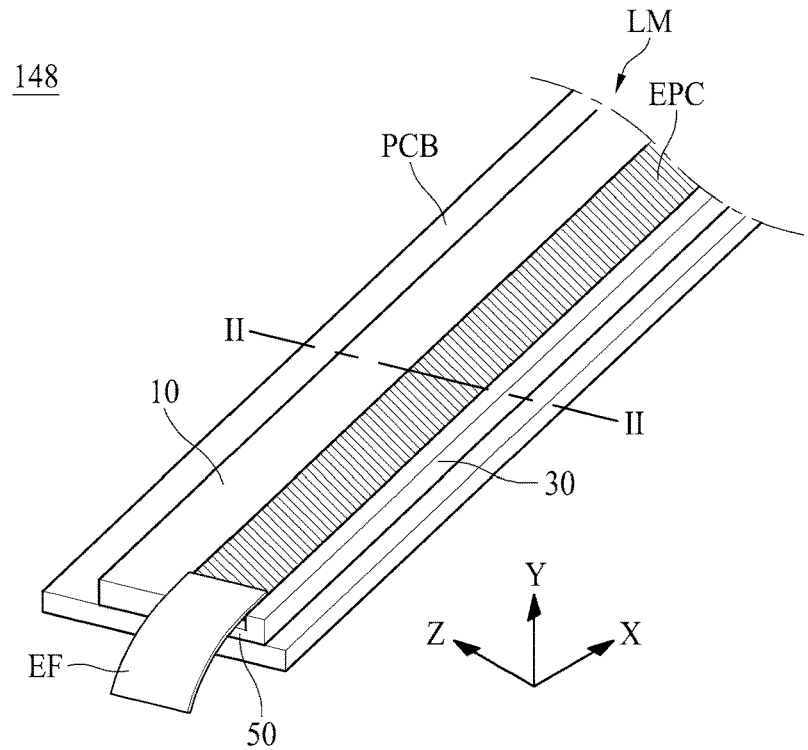
FIG. 4 is a perspective view of a light source module according to an embodiment of the present disclosure.
Figure 5:
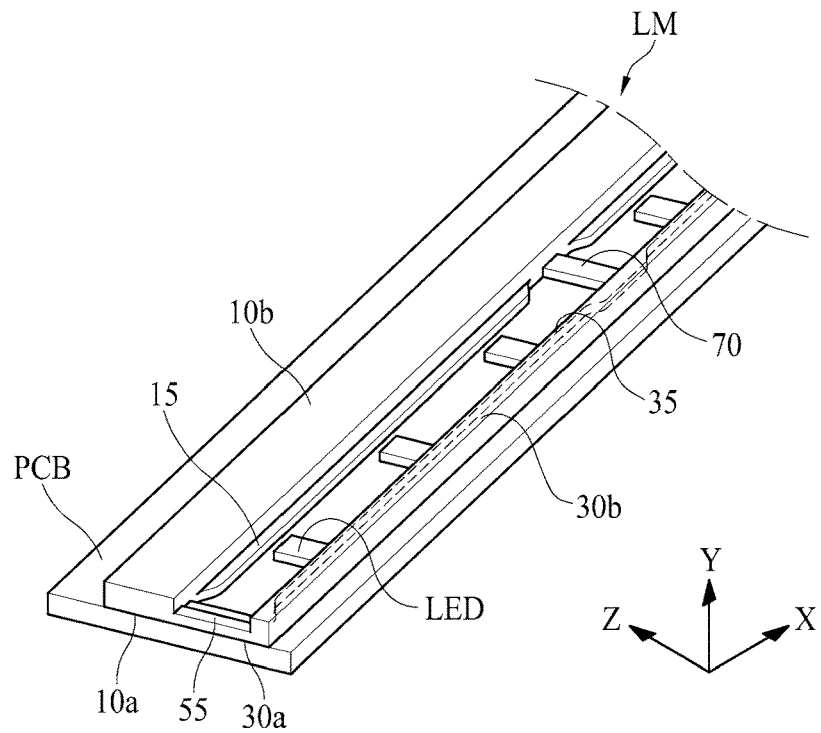
FIG. 5 is a perspective view of a light source module where an antistatic cover is omitted, according to an embodiment of the present disclosure.
Figure 6:
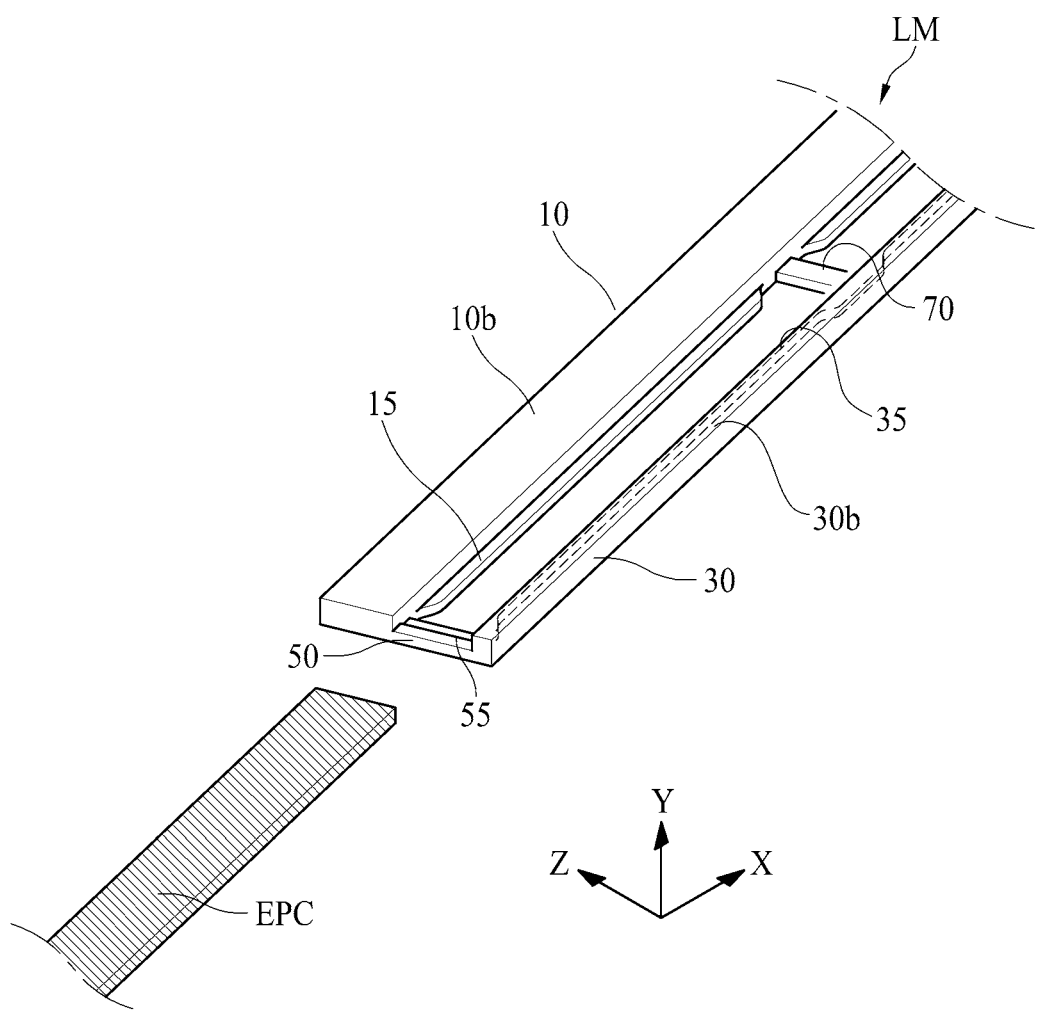
FIG. 6 is an exploded perspective view of each of an optical member and an antistatic cover according to an embodiment of the present disclosure.

FIG. 4 is a perspective view of a light source module according to an embodiment of the present disclosure. FIG. 5 is a perspective view of a light source module where an antistatic cover is omitted, according to an embodiment of the present disclosure. FIG. 6 is an exploded perspective view of each of an optical member and an antistatic cover according to an embodiment of the present disclosure.

Referring to FIGS. 4 to 6, the light source module 148 according to an embodiment of the present disclosure may include a printed circuit board PCB, a light source LED, an antistatic cover EPC, an optical member LM, and a ground member EF.

The printed circuit board PCB may include a driving power line to which a driving power is supplied from the outside. The printed circuit board PCB may supply the driving power, supplied through the driving power line from the outside, to the light source LED to allow the light source LED to emit light. An upper surface of the printed circuit board PCB according to an embodiment of the present disclosure may be covered by an insulating material. In more detail, a plurality of light sources LED may be mounted on the upper surface of the printed circuit board PCB, and the insulating material may be provided in a portion of the printed circuit board PCB other than portions where the light sources LED are disposed. Accordingly, the printed circuit board PCB according to an embodiment of the present disclosure blocks the transfer of static electricity by using the insulating material, thereby preventing the static electricity from being transferred to the light sources LED.

One or more light sources LED may be mounted on the printed circuit board PCB. The light source LED may be electrically connected to the driving power line provided on the printed circuit board PCB and may emit light with the driving power supplied through the driving power line. The light source LED may emit first color light with the driving power. For example, the light source LED may be a white light emitting diode chip that emits white light. Also, the light source LED may have a structure such as a lateral chip structure, a flip chip structure, a vertical chip structure, a lead frame package structure, a chip scale package structure, or the like.

The antistatic cover EPC may be disposed on the plurality of light sources LED to cover the plurality of light sources LED. The antistatic cover EPC may be supported to or accommodated into the optical member LM, and thus, may be disposed to face the printed circuit board PCB with the light sources LED therebetween. The antistatic cover EPC may be supported by a supporting part 70 of the below-described optical member LM.

The antistatic cover EPC according to an embodiment of the present disclosure may have a refractive index of 1.3 to 1.5. One surface of the antistatic cover EPC may face the light guide plate 144, the other surface may face the light sources LED, and the antistatic cover EPC may fill a space between the light guide plate 144 and each of the light sources LED. In a backlight unit and an LCD device of the related art, since the space between the light guide plate 144 and each of the light sources LED is filled with air, light emitted from each of the light sources LED is incident on the light guide plate 144 through air. In this case, a refractive index of the light emitted from each of the light sources LED may be about 1.5, a refractive index of air is 1, and a refractive index of the light guide plate 144 may be about 1.4 to about 1.5. Therefore, in the backlight unit and the LCD device of the related art, since a refractive index difference is large until the light emitted from each of the light sources LED is irradiated onto the light guide plate 144, total reflection occurs, causing the reduction in emission efficiency. However, in the backlight unit 140 and the LCD device 100 according to an embodiment of the present disclosure, since the antistatic cover EPC having a refractive index of 1.3 to 1.5 fills the space between the light guide plate 144 and each of the light sources LED, a refractive index difference is reduced until the light emitted from each of the light sources LED is irradiated onto the light guide plate 144, thereby preventing emission efficiency from being reduced.

The antistatic cover EPC may have a long rectangular shape like the printed circuit board PCB, but is not limited thereto. The antistatic cover EPC according to an embodiment of the present disclosure may be coupled to the optical member LM in a sliding type, or may be inserted into and coupled to a groove provided in an upper portion of the optical member LC, but is not limited thereto.

The antistatic cover EPC may include a transparent electrode TE. The transparent electrode TE may be connected to the below-described ground member and may be electrically connected to the light source housing 134 or the appearance case 150. Therefore, the antistatic cover EPC according to an embodiment of the present disclosure may be disposed between the light guide plate 144 and the light sources LED to prevent static electricity from being transferred from the light guide plate 144 to the light sources LED. Also, the antistatic cover EPC according to an embodiment of the present disclosure may allow the static electricity to flow to the transparent electrode TE, and by connecting the static electricity to the ground member EF so as to flow to the light source housing 134 or the appearance case 150, a path through the static electricity is transferred to the light sources LED is blocked.

The optical member LM may be disposed on the printed circuit board PCB, and in more detail, may be disposed between the printed circuit board PCB and the light incident surface of the light guide plate 144. The optical member LM may have a tunnel structure which is easily to assemble the antistatic cover EPC. The optical member LM may surround the plurality of light sources LED and may include a groove for supporting or accommodating the antistatic cover EPC. The optical member LM may surround the light sources LED to prevent light emitted from each of the light sources 10 from being incident on an area other than the light incident surface of the light guide plate 144, thereby minimizing the loss of the light.

The optical member LM may be formed of, for example, a material such as polyphthalamide (PA6T), polyamide 9 and terephtalic acid (PAST), PA10T, polycyclohexylene dimethyl terephthalate (PCT), liquid crystal polymer (LCP), or epoxy mold compound (EMC), but is not limited thereto. The optical member LM according to an embodiment of the present disclosure may include a first side surface part 10, a second side surface part 30, a connection part 50, and a supporting part 70.

The first side surface part 10 may be disposed on one side of the light source LED and may contact the printed circuit board PCB. A length of the first side surface part 10 in an X axis direction may be equal to a length of the printed circuit board PCB in the X axis direction. The first side surface part 10 may include a first substrate supporting surface 10*a* contacting the printed circuit board PCB, a first light guide plate supporting surface 10*b* facing the first substrate supporting surface 10*a*, and a first ring part 15 protruding from one edge of the first light guide plate supporting surface 10*b*, which are disposed on one side thereof. The first light guide plate supporting surface 10*b* may support the light guide plate 144 capable of expanding at a high temperature. The first ring part 15 may support the antistatic cover EPC, and an adhesive member may be disposed on an upper surface of the first ring part 15.

The second side surface part 30 may be disposed on the other side of the light source LED, may face the first side surface part 10, and may contact the printed circuit board PCB. A length of the second side surface part 30 in the X axis direction may be equal to the length of the printed circuit board PCB in the X axis direction. The second side surface part 30 may include a second substrate supporting surface 30*a* contacting the printed circuit board PCB, a second light guide plate supporting surface 30*b* facing the second substrate supporting surface 30*a*, and a second ring part 35 protruding from one edge of the second light guide plate supporting surface 30*b*, which are disposed on one side thereof. The second light guide plate supporting surface 30*b* may support the light guide plate 144 capable of expanding at a high temperature. The second ring part 35 may support the antistatic cover EPC, and an adhesive member may be disposed on an upper surface of the second ring part 15.

The connection part 50 may connect an end of the first side surface part 10 and an end of the second side surface part 30. The connection part 50 may be provided lower in position than a height of each of the first side surface part 10 and the second side surface part 30 with respect to the printed circuit board PCB. The connecting part 50 may include a stepped portion 55 which has an ascending height and is disposed in an outer portion of the connecting part 50.

The stepped portion 55 prevents the antistatic cover EPC from deviating from the optical member LM in the X axis direction. The below-described ground member EF may be connected to one end of the antistatic cover EPC which is exposed in a side surface through the connection part 50.

The supporting part 70 may be disposed between the first side surface part 10 and the second side surface part 30 and may connect the first side surface part 10 and the second side surface part 30. Also, the supporting part 70 may be provided as one or more between the plurality of light sources LED. The supporting part 70 may be provided higher in position than a height of each of the light sources LED with respect to the printed circuit board PCB and may support the antistatic cover EPC.

In FIGS. 5 and 6, it is illustrated that the supporting part 70 is provided lower in position than the height of each of the first side surface part 10 and the second side surface part 30 to support the antistatic cover EPC, but the present embodiment is not limited thereto. In other embodiments, the supporting part 70 may be provided to have the same height as that of each of the first side surface part 10 and the second side surface part 30 and may support the light guide plate 144, and the antistatic cover EPC may be disposed between adjacent supporting parts 70.

The ground member EF may ground the antistatic cover EPC. One side of the ground member EF may be connected to one end of the antistatic cover EPC, and the other side may be connected to the light source housing 134 or the appearance case 150. In more detail, the ground member EF may electrically connect the transparent electrode TE of the antistatic cover EPC to the light source housing 134 or the appearance case 150. Therefore, in the backlight unit 140 and the LCD device 100 according to an embodiment of the present disclosure, due to the ground member EF that connects one end of the antistatic cover EPC to the light source housing 134, static electricity flows out to the light source housing 134 without being transferred to the light sources LED. Accordingly, in the backlight unit 140 and the LCD device 100 according to an embodiment of the present disclosure, since the light source module 148 including the ground member EF is provided, a short circuit defect of the light source LED is prevented from occurring due to static electricity, thereby preventing image quality and reliability from being degraded.

The ground member EF may be formed of a thin metal layer such as an aluminum foil, and for example, may be formed of a conductive tape or a ground strap.

Figure 7:
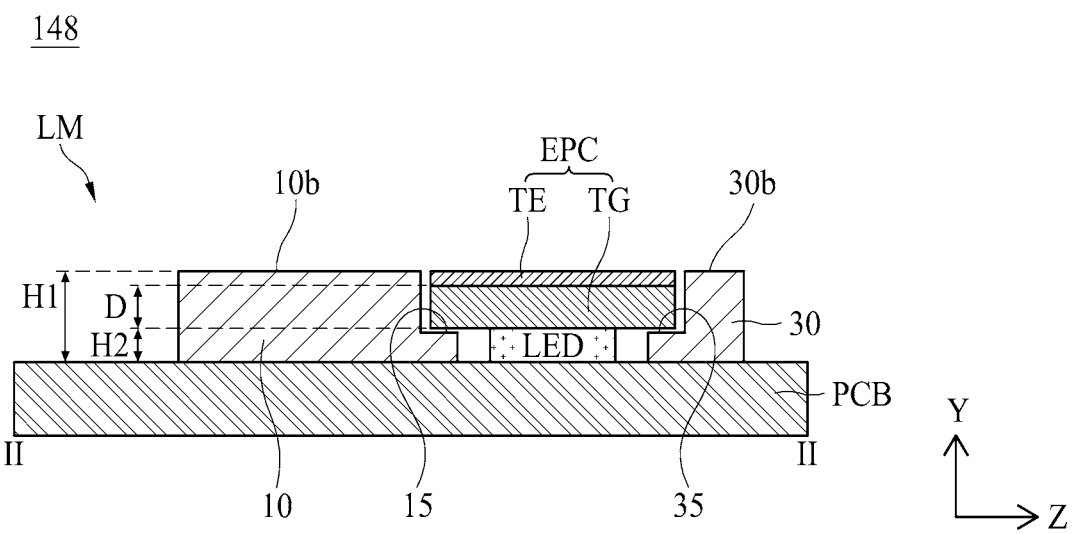
FIG. 7 is a cross-sectional view of a light source module according to an embodiment of the present disclosure.

FIG. 7 is a cross-sectional view of a light source module 148 according to an embodiment of the present disclosure.

Referring to FIG. 7, the light source module 148 according to an embodiment of the present disclosure may include a light source LED which is mounted on a printed circuit board PCB, an optical member LM which is provided on the printed circuit board PCB to surround the light source LED, and an antistatic cover EPC which is supported to the optical member LM to cover the light source LED.

The antistatic cover EPC may include a base substrate TG and a transparent electrode TE.

The base substrate TG may be formed of a transparent material in order for light emitted from the light source LED to be incident on the light guide plate 144 through the antistatic cover EPC. Also, the base substrate TG may have a thin and long shape and may be formed of a stiff material which is not bent or curved. For example, the base substrate TG may be formed of a material such as silicon, glass, polyethyleneterephthalate (PET), polyethylenapthanate (PEN), or the like.

When a thickness of the base substrate TG is D, a height of the optical member LM is H1, a height of the light source LED is H2, and a thermal expansion coefficient of the base substrate TG is a, the thickness of the base substrate TG satisfies "D=(H1−H2)*(1−a*40)".

The transparent electrode TE may be disposed on the base substrate TG. In more detail, the transparent electrode TE may be disposed on a top or a bottom of the base substrate TG, but may be disposed on the top facing the light guide plate 144. For example, the transparent electrode TE may be formed of a material such as indium tin oxide (ITO), zinc oxide ($ZnO_2$), and/or the like.

The transparent electrode TE according to an embodiment of the present disclosure may be provided in a mesh form on the base substrate TG. Static electricity capable of flowing in from the light guide plate 144 is difficult to predict a direction and a position, and for this reason, in a case where the transparent electrode TE is provided in the mesh form on the base substrate TG, even when the static electricity flows in from any position, the transparent electrode TE quickly blocks the static electricity in order for the static electricity not to be transferred to the light source LED.

The transparent electrode TE according to an embodiment of the present disclosure may be connected to the ground member EF. The ground member EF may electrically connect the transparent electrode TE to the light source housing 134 or the appearance case 150. Therefore, in the backlight unit 140 and the LCD device 100 according to an embodiment of the present disclosure, due to the ground member EF that connects one end of the antistatic cover EPC to the light source housing 134, static electricity flows out to the light source housing 134 without being transferred to the light sources LED.

Accordingly, in the backlight unit 140 and the LCD device 100 according to an embodiment of the present disclosure, since the light source module 148 including the ground member EF is provided, a short circuit defect of the light source LED is prevented from occurring due to static electricity, thereby preventing image quality and reliability from being degraded.

In the backlight unit and the LCD device according to the embodiments of the present disclosure, due to the ground member that connects one end of the antistatic cover to the light source housing, static electricity flows out to the light source housing without being transferred to the light sources.

Moreover, in the backlight unit and the LCD device according to the embodiments of the present disclosure, since the light source module including the ground member is provided, a short circuit defect of the light source is prevented from occurring due to static electricity, thereby preventing image quality and reliability from being degraded.

Moreover, in the backlight unit and the LCD device according to the embodiments of the present disclosure, since the antistatic cover having a refractive index of 1.3 to 1.5 fills a space between the light guide plate and the light source, a refractive index difference is reduced until light emitted from the light source is irradiated onto the light guide plate, thereby preventing emission efficiency from being reduced.

Moreover, in the backlight unit and the LCD device according to the embodiments of the present disclosure, since the optical member surrounds the light sources, light emitted from the light source is prevented from being incident on an area other than the light incident surface of the light guide plate, thereby minimizing the loss of the light.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light source module comprising:
a printed circuit board (PCB);
a plurality of light sources on the PCB;
an optical member on the PCB, the optical member surrounding the plurality of light sources, wherein the optical member comprises:
a first side surface part;
a second side surface part; and
at least one supporting part, wherein the at least one supporting part is disposed between the plurality of light sources and disposed between the first side surface part and the second side surface part;
an antistatic cover supported to the optical member to cover the plurality of light sources the antistatic cover comprising:
a base substrate disposed on the plurality of light sources, the plurality of light sources between the PCB and the base substrate, and
a transparent electrode provided on the base substrate; and
a ground member connected to one end of the transparent electrode of the antistatic cover and grounding the antistatic cover,
wherein one surface of the antistatic cover faces the plurality of light sources.

2. The light source module of claim 1, wherein the transparent electrode is provided in a mesh form on the base substrate.

3. The light source module of claim 1, wherein when a thickness of the base substrate is D, a height of the optical member is H1, a height of each of the plurality of light sources is H2, and a thermal expansion coefficient of the base substrate is a, "D=(H1−H2)*(1−a*40)" is satisfied.

4. The light source module of claim 1, wherein a top of the PCB is covered by an insulating material.

5. The light source module of claim 1, wherein the antistatic cover has a refractive index of 1.3 to 1.5.

6. A light source module comprising:
a printed circuit board (PCB);
a plurality of light sources on the PCB;
an optical member on the PCB, the optical member surrounding the plurality of light sources, wherein the optical member comprises:
a first side surface part;
a second side surface part; and
at least one supporting part, wherein the at least one supporting part is disposed between the plurality of light sources and disposed between the first side surface part and the second side surface part;
an antistatic cover supported to the optical member to cover the plurality of light sources; and
a ground member connected to one end of the antistatic cover and grounding the antistatic cover,
wherein one surface of the antistatic cover faces the plurality of light sources.

7. A backlight unit comprising:
a light source module including a printed circuit board (PCB),
a plurality of light sources on the PCB, an optical member on the PCB, the optical member surrounding the plurality of light sources,
an antistatic cover supported to the optical member to cover the plurality of light sources, and
a ground member connected to one end of the antistatic cover and grounding the antistatic cover, wherein the optical member comprises:
a first side surface part;
a second side surface part; and
at least one supporting part, wherein the at least one supporting part is disposed between the plurality of light sources and disposed between the first side surface part and the second side surface part;
a light guide plate including a light incident surface; the light source module being disposed to face the light incident surface of the light guide plate; and
a light source housing supporting the light guide plate, the light source module being mounted on the light source housing,
wherein one surface of the antistatic cover faces the light guide plate and another surface faces the plurality of light sources, and
wherein the antistatic cover comprises:
    a base substrate disposed on the plurality of light sources, the plurality of light sources between the PCB and the base substrate, and
    a transparent electrode provided on the base substrate, the transparent electrode connected to the ground member.

8. The backlight unit of claim 7, wherein the ground member is electrically connected to the light source housing.

9. A liquid crystal display device comprising:
a light source module including a printed circuit board (PCB),
a plurality of light sources on the PCB, an optical member on the PCB, the optical member surrounding the plurality of light sources,
an antistatic cover supported to the optical member to cover the plurality of light sources, and a ground member connected to one end of the antistatic cover and grounding the antistatic cover,
wherein the optical member comprises:
a first side surface part;
a second side surface part; and
at least one supporting part, wherein the at least one supporting part is disposed between the plurality of light sources and disposed between the first side surface part and the second side surface part; a backlight unit including the light source module; and
a liquid crystal panel on the backlight unit,
wherein one surface of the antistatic cover faces the light guide plate and another surface faces the plurality of light sources, and wherein the antistatic cover comprises:
    a base substrate disposed on the plurality of light sources, the plurality of light sources between the PCB and the base substrate; and
    a transparent electrode provided on the base substrate, the transparent electrode connected to the ground member.

10. A backlight unit comprising:
a light source module including a printed circuit board (PCB), a plurality of light sources on the PCB, an optical member on the PCB, the optical member surrounding the plurality of light sources, an antistatic cover supported to the optical member to cover the plurality of light sources, and a ground member connected to one end of the antistatic cover and grounding the antistatic cover;
a light guide plate including a light incident surface;
the light source module being disposed to face the light incident surface of the light guide plate; and
a light source housing supporting the light guide plate, the light source module being mounted on the light source housing,
    wherein one surface of the antistatic cover faces the light guide plate and the other surface faces the plurality of light sources, and
    wherein the optical member comprises:
        a first side surface part,
        a second side surface part, and
        at least one supporting part, wherein the at least one supporting part is disposed between the plurality of light source and disposed between the first side surface part and the second side surface part.

11. A liquid crystal display device comprising:
a light source module included a printed circuit board (PCB), a plurality of light sources on the PCB, an optical member on the PCB, the optical member surrounding the plurality of light sources, an antistatic cover supported to the optical member to cover the plurality of light sources, and a ground member connected to one end of the antistatic cover and grounding the antistatic cover;
a backlight unit included the light source module; and
a liquid crystal panel on the backlight unit,
    wherein one surface of the antistatic cover faces the light guide plate and the other surface faces the plurality of light sources, and
    wherein the optical member comprises:
        a first side surface part,
        a second side surface part, and
        at least one supporting part, wherein the at least one supporting part is disposed between the plurality of light source and disposed between the first side surface part and the second side surface part.

* * * * *